(12) United States Patent
Bech (10) Patent No.: US 7,837,439 B2
(45) Date of Patent: Nov. 23, 2010

(54) WIND TURBINE BLADE COMPRISING ONE OR MORE OSCILLATION DAMPERS

(75) Inventor: Anton Bech, Ringkobing (DK)

(73) Assignee: Vestas Wind Systems A/S (DK)

( * ) Notice: Subject to any disclaimer, the term of this patent is extended or adjusted under 35 U.S.C. 154(b) by 207 days.

(21) Appl. No.: 12/114,511

(22) Filed: May 2, 2008

(65) Prior Publication Data

US 2009/0142193 A1   Jun. 4, 2009

Related U.S. Application Data

(63) Continuation of application No. PCT/DK2005/000702, filed on Nov. 3, 2005.

(51) Int. Cl.
*F01D 11/00*   (2006.01)

(52) U.S. Cl. .......................... 416/62; 416/500

(58) Field of Classification Search ................ 416/140, 416/500, 144, 145, 62
See application file for complete search history.

(56) References Cited

U.S. PATENT DOCUMENTS

| | | | | |
|---|---|---|---|---|
| 2,349,187 A | * | 5/1944 | Meyer | 416/500 |
| 2,999,669 A | * | 9/1961 | McGinnis | 416/500 |
| 4,097,193 A | * | 6/1978 | Brunsch et al. | 416/500 |
| 4,334,825 A | * | 6/1982 | Braun et al. | 416/134 A |
| 6,626,642 B1 | * | 9/2003 | Veldkamp | 416/79 |
| 6,672,837 B1 | | 1/2004 | Veldkamp et al. | |

FOREIGN PATENT DOCUMENTS

| | | |
|---|---|---|
| DE | 10202995 | 8/2003 |
| WO | WO9521327 | 8/1995 |
| WO | WO9932789 | 7/1999 |
| WO | WO02084114 | 10/2002 |

OTHER PUBLICATIONS

International Search Report, Mar. 30, 2006, 3 pages.

* cited by examiner

*Primary Examiner*—Richard Edgar
(74) *Attorney, Agent, or Firm*—St. Onge Steward Johnston & Reens LLC (57) ABSTRACT

A wind turbine blade comprising one or more oscillation dampers for damping oscillations or vibrations of the wind turbine blade. The first damper parts being rigidly connected to the blade or being a part of the blade. The dampers further comprise second damper parts, wherein the first damper part surfaces and the second damper part surfaces are arranged to move relatively to each other during the oscillations. Even further the dampers comprise a load transferring coupling, coupling the first damper part surfaces and the second damper part surfaces, so that the relative movement results in a oscillation-damping dissipation of kinetic energy.

34 Claims, 8 Drawing Sheets

WIND TURBINE BLADE COMPRISING ONE OR MORE OSCILLATION DAMPERS

CROSS-REFERENCE TO RELATED APPLICATIONS

The present application is a continuation of pending International patent application PCT/DK2005/000702, filed Nov. 3, 2005, which designates the United States, the content of which is incorporated herein by reference.

FIELD OF THE INVENTION

The invention relates to a wind turbine blade comprising one or more oscillation dampers for damping oscillations or vibrations of a wind turbine blade, a wind turbine, an oscillation damper, a method for damping oscillations of a wind turbine blade and use hereof.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Oscillations and vibrations of the wind turbine blades are undesirable in that, they can in worse case damage the blades. In particular edge-wise oscillations, which are oscillations along the cord between the trailing edge and the leading edge of the blade, can damage the blade, as it have little damping towards this mode of oscillations.

Furthermore, edgewise oscillations are particularly harmful, in that they among other things can cause cracks at the root of the blade or along the trailing edge. In known cases such oscillations has caused the blade to fail to such degree, that the blade has disintegrated from the turbine.

Both stall and pitch controlled wind turbine are in risk of being damaged by edge-wise oscillations. The stall controlled turbine is mostly seeing this problem when operating in high winds beyond the stall point. The pitch regulated turbine is mostly seeing this problem when parked in high wind with the rotor locked.

To avoid oscillations of the blade it is known to provide the blades with different forms of mechanical dampers, most often based on the principle of a spring mounted mass combined with a damping device or they can be provided with different kinds of liquid dampers.

An example of a liquid damper is disclosed in WO 99/32789, where the tips of the blades are provided with a tuned liquid damper system. A liquid flows freely in a number of cambers placed as close to the tip of the blade as possible. The chambers have a specific length, which is adapted to the natural edgewise frequency of the specific blade type. Even though these kinds of frequency specific dampers weigh less than traditional multi-frequency dampers, they still have the disadvantage of adding considerable weight to the tip of the blade, where weight is least desired. The damping capacity is proportional with the width of the damper and the frequency.

As modern wind turbines get bigger both in output and in size, the length and the size of the blade also increase. As the blade becomes bigger and heavier their natural edgewise frequency becomes lower—down to a few Hz or even bellow one Hz, and the blade therefore becomes easier to excite by the wind. As the natural edgewise frequency gets lower, the mass of a mechanical damper, a liquid damper or a tuned liquid damper has to be increased, which leads to an increase in size.

The width of the blade decreases towards the tip, and when the dampers get longer and wider, the space inside the blade at the tip becomes too small to contain the damper. The damper has to be moved further away from the tip, and the further from the tip it is moved, the bigger and heavier it has to be. This is of cause disadvantageous, in that the heavier the blades are, the more load is induced to other components of the wind turbine. This requires stronger components which most often are more expensive.

Another disadvantage in traditional blade dampers is, that dampers placed close to the tip of the blade will also inevitably interfere with the load-carrying structure of the blade, hereby potentially compromising the structural integrity of the blade.

An object of the invention is to provide for a wind turbine blade comprising an oscillation damper without the mentioned disadvantages.

Especially it is an object of the invention to provide technique for damping oscillations of a wind turbine blade, which are efficient even in large and long wind turbine blades.

SUMMARY OF THE INVENTION

The invention provides for a wind turbine blade comprising one or more oscillation dampers for damping oscillations or vibrations of the wind turbine blade. The dampers comprise one or more first damper parts having one or more first damper part surfaces. The first damper parts being rigidly connected to the blade and/or being a part of the blade. The dampers further comprise one or more second damper parts having one or more second damper part surfaces, wherein the first damper part surfaces and the second damper part surfaces are arranged to move relatively to each other during the oscillations. Even further the dampers comprise a load transferring coupling, directly or indirectly coupling the first damper part surfaces and the second damper part surfaces, so that the relative movement result in a oscillation-damping dissipation of kinetic energy.

By connecting the first damper parts rigidly to the blade, it is ensured that the first damper part is stretched and compressed substantially as much as the blade is, when the blade oscillates.

By coupling the second and first damper part surfaces directly or indirectly by means of a load transferring coupling, the relative motion between the first and the second damper parts, originating from oscillations of the blade, can induce shear force between the two parts. If the coupling is a friction coupling or if the coupling material has a plastic behaviour, the motion between first and second part will cause energy loss in form of dissipation of kinetic energy, hence damping occurs.

Furthermore, a conventional damper most often attempts to reduce the amplitude of the blade oscillation and therefore has to be positioned where magnitude of the blade deflection is the biggest. This is disadvantageous, in that the deflection is biggest at the tip of the blade and additional weight from a damper, will strain the blade, the hub and the rest of the wind turbine, more, the closer to the tip it is positioned.

A damper according to the invention will have the best damping effect if it is positioned where the strain in the blade is the biggest, and this will most often be closer to the root than to the tip of the blade. It is therefore advantageous to use a damper according to the invention, in that it can be positioned in a less load sensitive position in or on the blade.

In an aspect of the invention, said one or more oscillation dampers are positioned on and/or in the part of said wind turbine blade which are constituted by the inner 80% of said blades total length, preferably the inner 50% of said blades total length, as measured from the root of said blade.

The closer to the tip of the blade a given weight is added to the blade, the more strain this weight will cause, both in the blade itself, in the hub and in the rest of the wind turbine, especially when the blade rotates. It is therefore advantageous that the weight of the damper is kept as low as possible and that it is located as close to the root of the blade as possible, under consideration of the dampers efficiency.

In an aspect of the invention, said one or more oscillation dampers are positioned in, on and/or in proximity of said wind turbine blades trailing edge.

When a wind turbine blade oscillates edgewise, alternately the trailing edge and the leading edge of the blade are stretched and compressed. Since the trailing edge is furthest away from the blades elastic centre, the trailing edge sees the highest strain, hence stress inflicted by edgewise oscillations is most critical along the trailing edge. It is therefore advantageous to position the oscillation dampers somewhere around the wind turbine blades trailing edge.

In an aspect of the invention, said second damper parts are substantially inflexible.

By making the second damper parts substantially inflexible, the relative motion between the relatively flexible first damper parts and the relatively inflexible second damper parts becomes considerable, hereby enabling a high dissipation of the kinetic energy and thereby providing the damper with efficient damping qualities.

In an aspect of the invention, said one or more second damper parts has a relationship between modulus of elasticity and density which is greater than 10 MPa·m³/kg.

This relation indicates how inflexible a material is with regard to its weight. It is advantageous that the second damper parts are made of a rigid and inflexible material, in that it will increase the relative motion between the first and second damper parts. Furthermore it is advantageous that the material is light, in that the weight of the blade has a critical influence on the blade itself and the rest of the wind turbine.

The present limit is therefore advantageous, in that materials below the limit becomes too heavy in relation to their inflexibility.

Suitable materials for making second damper parts could e.g. be steel, stainless steel, aluminium or some other rigid and inflexible metal or alloy. Or it could be some sort of inflexible plastic or a composite which could be fibre reinforced.

In an aspect of the invention, said one or more second damper parts are made of a fibre reinforced polymer-matrix composite, such as carbon fibre reinforced resin.

Fibre reinforced polymer-matrix composite, such as carbon fibre reinforced resin are very strong materials with a very high relationship between modulus of elasticity and density. Furthermore, these materials are advantageous, in that they most often are very durable and inexpensive.

In an aspect of the invention, said load transferring coupling has a high load transferring capacity, which at least is better than waters load transferring capacity.

The more load that is transferred between the first and second damper part, the more efficiently the damper will work. It is therefore advantageous that the load transferring coupling has a high load transferring capacity, and since water has relatively low cohesive and adhesive qualities making it relatively poor at transferring loads, it is important that the couplings load transferring capacity at least is better than waters.

In an aspect of the invention, said one or more second damper parts and/or said one or more first damper parts has an elongated shape.

By providing the damper part with an elongated shape is possible to provide a long damper with good damping qualities particularly in the elongated direction. This is advantageous, in that the damper is to be use in the longitudinal direction of an elongated blade.

In an aspect of the invention, said one or more first damper parts comprise one or more cavities, wherein said one or more second damper parts are substantially located.

The second damper parts can be parts, which besides the load-transferring coupling, a separate from the blade and the first damper parts. It is therefore advantageous to locate the second damper parts in cavities in the first damper parts, in that it provides for a simple and efficient way of controlling the second damper parts position. Furthermore, placing the second damper parts in cavities in the first damper parts provides for a very efficient damper design.

In an aspect of the invention, said one or more cavities comprise more than one of said second damper parts.

When the blade deflects due to oscillations, a part of the blade can be stretched up to more than 1 mm per running meter of the blade. If e.g. a 5 meter long damper was positioned in this area, and the second damper part was one 5 meter long bar positioned in a cavity in the first damper part, the relative distance between the ends of the second damper part and an adjacent point on the first damper part (or the blade) would vary more than 2.5 mm, if the second damper part was completely inflexible. This could lead to very uneven wear of the damper parts, if the coupling between them was a friction coupling or it could lead to tearing of the substance, if the coupling e.g. was a semi-liquid substance, and if the shear rate was high due to a small distance between the parts.

It is therefore advantageous to provide the cavities with more than one second damper parts, in that the second damper parts can be made shorter, whereby reducing the relative distance variation between the ends of the second damper parts and the sides of the cavities in the first damper part, hereby minimizing the risk of uneven or unwanted wear and tear.

In an aspect of the invention, said one or more cavities are formed as orifices, slits, gaps, and/or holes.

Hereby is achieved an advantageous embodiment of the invention.

In an aspect of the invention, said more than one second damper parts are placed substantially end to end in said one or more cavities.

It is advantageous to place the second damper parts substantially end to end in the cavities, in that it provides for a more durable and efficient damper.

In an aspect of the invention, said one or more second damper parts and/or said one or more first damper parts comprise separating and/or fixating means for substantially preventing said one or more second damper parts from moving freely at least in their longitudinal direction.

If the second damper parts can move freely in the cavities there is a potential risk of the parts wandering towards one end of the cavity and thereby colliding. Abutting parts could lead to structural damage to the parts and/or it could lead to a change in the damper characteristics. It is therefore advantageous to separate and/or fixate the second damper parts.

In an aspect of the invention, said separating means are volume compensating material such at an elastomer comprising gas filled bubbles, positioned between or at the ends of said one or more second damper parts.

It is advantageous to separate the second damper parts by use of a volume compensating material, in that it enables the ends of the second damper parts to move more or less freely, when exposed to loads from the coupling, but because of the volume compensating material, the second damper parts will return to their original position when the load is removed or reversed.

Furthermore it is advantageous to use a material such as elastomer comprising gas filled bubbles for this purpose, in that an elastomer by nature is very elastic, which ensures that it attempts to regain its original shape when deformed, and it is advantageous to embed bubbles filled with e.g. air or CO2 in the elastomer, in that it enables the elastomer to change volume, hereby compensating for any change in volume in the cavities at the ends of the second damper parts when the second damper parts attempts to move or are stretched slightly.

In an aspect of the invention, said fixating means comprise means for fixating said one or more second damper parts at the middle or in close proximity of the middle of said one or more second damper parts longitudinal extent.

As previously mentioned the relative distance variation between the ends of the second damper parts and the sides of the cavities in the first damper part, can be relatively big (depending on the length and inflexibility of the second damper parts) when the blade oscillates, but in principle the relative distance variation between the middle of the second damper parts and adjacent points on the sides of the cavities in the first damper part, is infinitely little. It is therefore advantageous to prevent the second damper parts from wandering freely in the cavities by fixating them at the middle, in that this will not affect their functionality noticeably.

In an aspect of the invention, said first damper part surfaces and said second damper part surfaces are coupled by a semi-liquid substance.

Using a semi-liquid substance for making an indirect coupling between the surfaces is advantageous, in that for instance a friction coupling between the two damper parts, because of wear an tear, will over time lose its ability to convert the energy from the blade oscillations, whereas a coupling made of a semi-liquid substance can be made very durable and can therefore enable, that the damper is made completely maintenance-free.

It should be emphasised that by the term "semi-liquid substance" is to be understood a very high viscous liquid, which is so thick, that it almost is solid. Examples of such a substance could e.g. be semisolid epoxy, very high viscous silicon oil, bitumen, poly-nitrile or other polymer melts.

In an aspect of the invention, said semi-liquid substance surrounds or substantially surrounds said one or more second damper parts.

If the coupling between the two damper parts was a friction coupling, only the surfaces "rubbing" against each other would convert energy, but by making the semi-liquid substance surround or substantially surround the second damper parts, it is possible to use all the second damper parts surfaces for conversion of the energy, no matter the shape of the damper parts.

In an aspect of the invention, said semi-liquid substance has a viscosity of between 50 and 200,000 Pa·s, preferably between 200 and 60,000 Pa·s and most preferred between 500 and 8,000 Pa·s at 20° C.

If the viscosity of the semi-liquid substance is too low, the semi-liquid substances ability to transfer the loads and thereby converting the energy is reduced. If the viscosity of the semi-liquid substance becomes the high, there is a considerable risk of tearing the substance and thereby also reducing its ability to converting the energy.

The present viscosity ranges therefore provide for an advantageous embodiment of the invention particularly regarding the semi-liquid substance energy converting efficiency.

In an aspect of the invention, said semi-liquid substance has a viscosity index which is greater than 80.

Viscosity index is an empirical measure of the viscosity-temperature characteristics of a fluid. When the variation is small the index is high. Furthermore the semi-liquid substances ability to aid the damping of the oscillations is depending on its viscosity.

It is therefore advantageous, that the viscosity index is high and preferably greater than 80, to ensure that the semi-liquid substances viscosity is only to a minor degree dependent on the temperature.

In an aspect of the invention, said semi-liquid substance are completely surrounded by said one or more first damper parts and/or said blade.

Even though the semi-liquid substance is very high viscous it is still to some degree a liquid which will flow, especially when deformed by the movement of the damper parts. To ensure that the semi-liquid substance stays in place during the entire life of the damper, it is therefore advantageous to completely surround the substance by the first damper parts and/or the blade.

In an aspect of the invention, said one or more first damper parts are formed integrally in said blades load-carrying structure.

Forming the first damper parts integrally in the blades load-carrying structure is advantageous, in that the weight of the first damper parts hereby can be written off as structural members of the blade, thereby considerably reducing the total weight of the damper.

In an aspect of the invention, said one or more oscillation dampers are positioned in, on or in proximity of the position on and/or in said wind turbine blade where the strain originating from edgewise blade oscillations is the biggest.

A damper according to the invention will be most efficient if it is mounted or integrated in/on the blade where expansion and compression of the blade is the biggest. It is therefore advantageous to position the dampers where the strain is the biggest, in that it is also here that the blade is stretched or compressed the most.

In an aspect of the invention, said one or more second damper parts has a longitudinal extent of between 10 and 10,000 mm, preferably between 100 and 5,000 mm and most preferred between 200 and 3,000 mm.

The strain difference between the stretched and contracted first damper part and the second damper part will act with shear force between the two damper parts. Either through friction or through a semi-liquid substance, this load is transferred to the second damper part. The longer the second damper parts are the more force is transferred to the individual parts. If the second damper parts are long, the middle part of the bars will yield and the shear transfer on this part of the bars will be low. If the second damper parts are short, the shear deformation will be low and the forces and the efficiency low. Hence an optimum of the second damper parts length may exist. This optimum will depend on the inflexibility of the second damper parts and the shear function between second damper part and first damper part.

The present length ranges therefore provide for an advantageous embodiment of the invention particularly regarding efficiency, when used in a damper with a realistic shear function between second damper part and first damper part, and where the second damper parts are made of a substantially inflexible material such as a fibre reinforced polymer-matrix composite.

In an aspect of the invention, the distance between a first damper part surface and a second damper part surface is between 0.001 and 2 mm, preferably between 0.01 and 1 mm and most preferred between 0.1 and 0.6 mm.

If the distance between neighbouring surfaces is too little, there is a considerable risk of tearing the semi-liquid substances, if the relative motion between the two damper parts becomes too high. If the distance between the surfaces becomes too big, the relative shear angle difference during the relative motion between the two damper parts, becomes to small and the efficiency of the damper is reduced.

The present distance ranges therefore provide for an advantageous relation between durability and efficiency of the damper.

In an aspect of the invention, said one or more oscillation dampers are provided primarily for damping edgewise oscillations or vibrations of said wind turbine blade.

Since wind turbine blades have little self-damping towards edge-wise oscillations, it is advantageous to provide the blade with oscillation dampers primarily for damping edgewise oscillations.

The invention further provides for a wind turbine comprising at least one wind turbine blade according to any of the preceding claims.

Providing a wind turbine with blades according to the invention is advantageous, in that an oscillation damper according to the invention most often is lighter that conventional blade dampers and any additional weight from a oscillation damper according to the invention is added closer to the blades rotational centre. Hereby the wind turbine is less strained.

Even further the invention provides for an oscillation damper for damping edgewise oscillations or vibrations of a wind turbine blade. Said damper comprising one or more first damper parts having one or more first damper part surfaces, one or more second damper parts having one or more second damper part surfaces, wherein said first damper part surfaces and said second damper part surfaces are arranged to move relatively to each other during said oscillations. Said dampers further comprising a load transferring coupling directly or indirectly coupling said first damper part surfaces and said second damper part surfaces, so that said relative movement result in a oscillation-damping dissipation of kinetic energy.

Hereby is achieved an advantageous embodiment of an oscillation damper according to the invention.

In an aspect of the invention, said one or more first damper part surfaces and said one or more second damper part surfaces are coupled by a semi-liquid substance.

In an aspect of the invention, said one or more first damper parts comprise one or more cavities, wherein said one or more second damper parts are substantially located.

In an aspect of the invention, said one or more second damper parts and/or said one or more first damper parts has an elongated shape.

In an aspect of the invention, said one or more cavities comprise means for substantially preventing said one or more second damper parts from moving freely at least in their longitudinal direction.

In an aspect of the invention, said second damper parts are substantially inflexible, having a relationship between modulus of elasticity and density which is greater than 10 MPa·m³/kg.

The invention also provides for a method for damping oscillations of a wind turbine blade, said method comprising the steps of integrating or joining one or more first damper parts having one or more first damper part surfaces in and/or to said wind turbine blade, arranging one or more second damper part surfaces of one or more second damper parts to move relatively to said one or more first damper part surfaces during said oscillations, and directly or indirectly coupling said first damper part surfaces to said second damper part surfaces by means of a load transferring coupling, so that said relative movement result in a oscillation-damping dissipation of kinetic energy.

Conventional dampers in principle usually store the energy/motion of the deflection of the blade and use it to produce a countermotion against the reverse deflection, e.g. to reduce the amplitude of the oscillation or to disable oscillations at the blades natural frequency. But it takes a big mass to store the energy of the motion of an oscillating blade and the mass has to be placed in a load-wise very disadvantageous place to function efficiently.

By transferring the motion of the blade from a first damper part to a second damper part, it is possible to convert the energy of the motion to heat and thereby it is possible to completely remove the energy or at least some of the energy. This method for damping oscillations of a blade is therefore advantageous, in that it can be preformed by a relatively simple and light damper which can be placed more advantageous on the blade weight distribution-wise, and it will be efficient even at relatively low frequencies such as frequencies below 3 Hz.

In an aspect of the invention, said one or more first damper part surfaces and said one or more second damper part surfaces are coupled by a semi-liquid substance.

In an aspect of the invention, said semi-liquid substance has a viscosity of between 50 and 200,000 Pa·s, preferably between 200 and 60,000 Pa·s and most preferred between 500 and 8,000 Pa·s at 20° C.

In an aspect of the invention, said method further involves preventing said one or more second damper parts from moving freely at least in a longitudinal direction.

The invention further provides for use of an oscillation damper in a wind turbine blade according any of claims 1 to 26 as a unit for supplementary mounting in and/or on a wind turbine blade.

Using an oscillation damper according to the invention as a unit for supplementary mounting in and/or on a wind turbine blade is advantageous, in that compared to traditional dampers, a damper according to the invention can be mounted both on and in the blade. And if it is to be mounted on the inside of the blade, it is relatively simple to retrofit, especially because it usually has to be mounted relatively close to the root of the blade, where the blade is both high and wide, therefore making it possible and realistic to retrofit a damper according to the invention in/on a existing blade.

BRIEF DESCRIPTION OF THE DRAWINGS

The invention will be described in the following with reference to the figures in which.

DETAILED DESCRIPTION OF THE INVENTION

Figure 1:
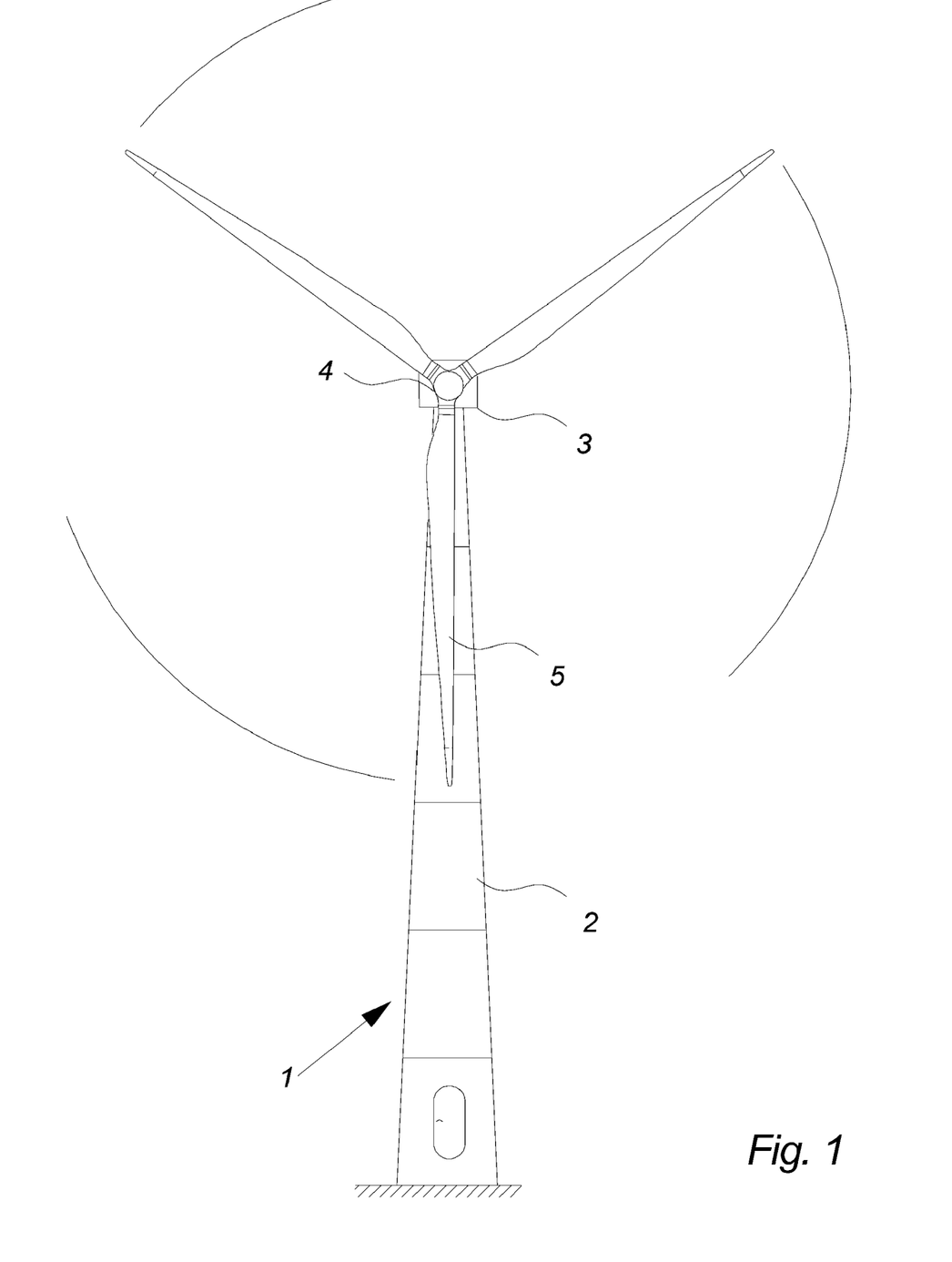
FIG. 1 illustrates a large modern wind turbine known in the art, as seen from the front.

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
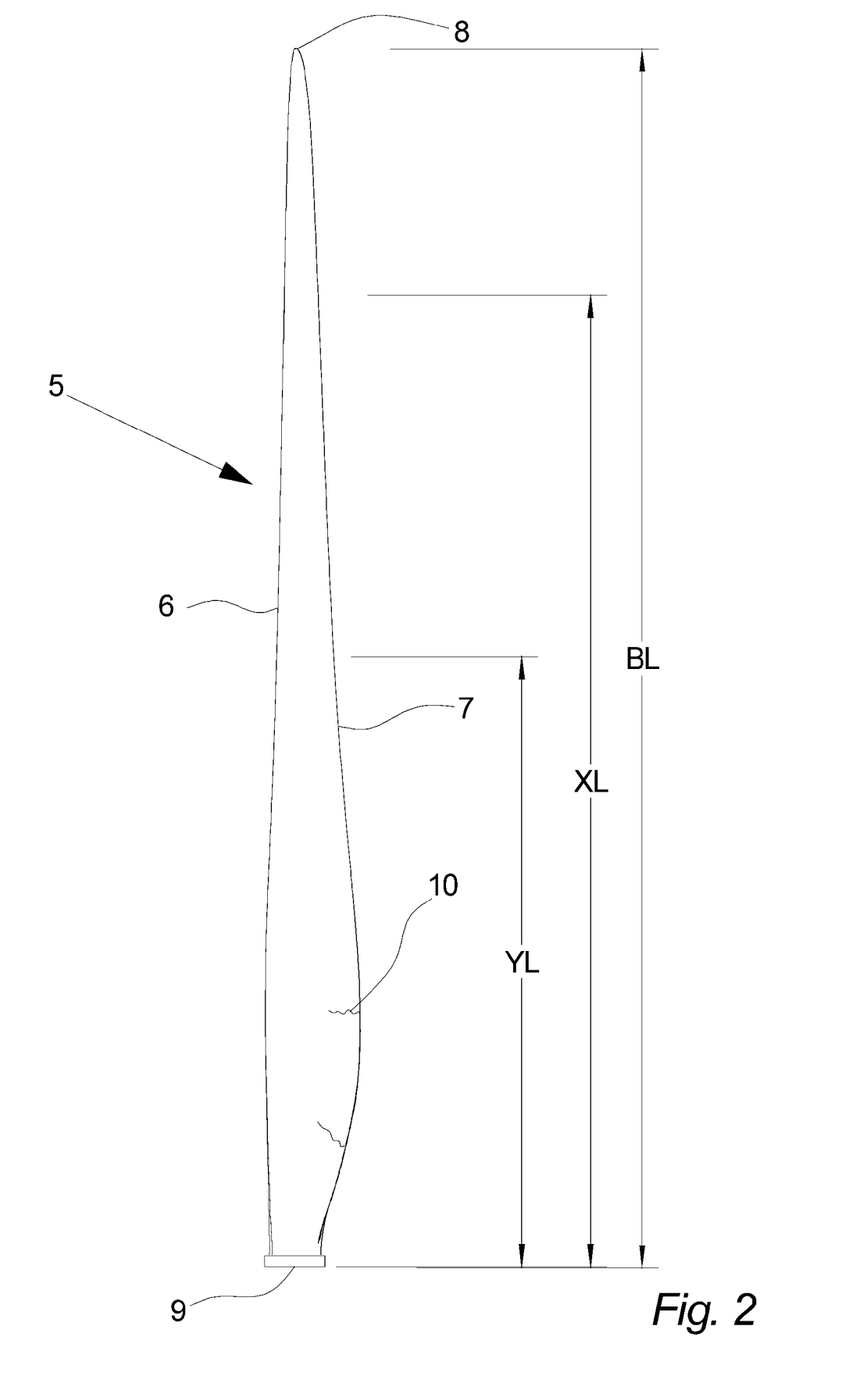
FIG. 2 illustrates a wind turbine blade, as seen from the front.

FIG. 2 illustrates a wind turbine blade 5, as seen from the front/pressure side 31. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

A wind turbine blade 5 known in the art, has an elastic centre which is closer to the leading edge 6 than to the trailing edge 7 at least regarding most parts of the blade 5. If edgewise oscillations occur at a frequency at or close to the blades first natural edgewise frequency, especially the trailing edge 7 is therefore exposed to considerable strain, which under certain conditions can damaged the blade and result in cracks 10 along the trailing edge 7.

The length of the blade 5 is indicated by BL. XL indicates the inner 80% of the blade 5 and YL indicates the inner 50% of the blade 5.

Figure 3:
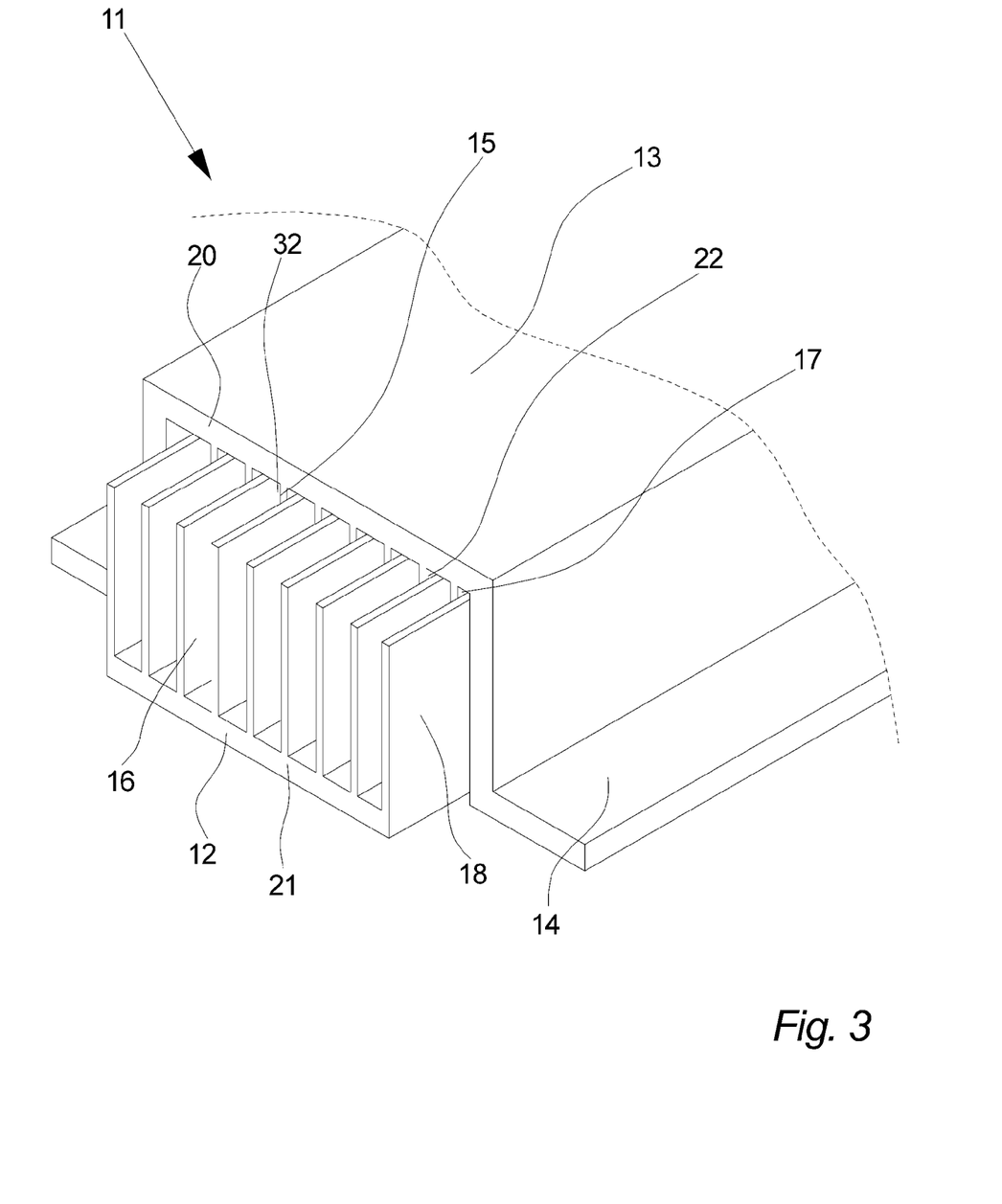
FIG. 3 illustrates a part of an embodiment of an oscillation damper according to the invention as seen in perspective.

FIG. 3 illustrates a part of an embodiment of an oscillation damper 11 according to the invention as seen in perspective. The damper 11 comprise a second damper part 12, which in this case looks similar to the "comb" like heat sinks profiles used for cooling electronics. The damper 11 further comprise a corresponding first damper part 13. By designing the two damper parts 12, 13 in this way and making them interleaf into each other, the shear area between the two can be very large.

The first damper part 13 can be connected to the wind turbine blade at its extending side parts 14 e.g. by means of screws, bolts, adhesive means or welding and when the blade 5 starts to stretch or contract due to oscillations, the first damper part 13 is extended or contracted substantially likewise. If the bars 15, 16 on the first damper part 13 and on the second damper part 12 are made so wide, that their side surfaces 17, 18 touch each other, the two damper parts 12, 13 becomes directly coupled, and the first damper part surfaces 17 and the second damper part surfaces 18 will rub against each other. The second damper part 12 could then be made of a substantially inflexible material such as steel, stainless steel, aluminium or a fibre reinforced polymer-matrix composite, such as carbon fibre reinforced resin, ensuring that the second damper part 12 substantially does not stretch when the flexible first damper part 13 stretches.

When the blade 5 stretches due to oscillations, the energy of the motion or at least some of the energy of the motion is transferred to the flexible part 13 and hereby converted to heat produced by the friction between the side surfaces 17, 18.

When the oscillation of the blade 5 has reached its maximum and the blade 5 starts to contract again, the damper 11 will again attempt to resist this motion by dissipating the kinetic energy.

In a preferred embodiment of the invention the side surfaces 17, 18 of the bars 15, 16 of the second damper part 12 and the first damper part 13 are spaced slightly apart and the space between the two damper parts 12, 13 is filled with at high viscous fluid such as a semi-solid or semi-liquid substance 19, which indirectly couple the two damper parts 12, 13 together. This semi-liquid substance 19 could e.g. be semi-solid epoxy, very high viscous silicon oil, some sort of polymer melt or another substance with a viscosity of between 50 and 200,000 Pa·s, preferably between 200 and 60,000 Pa·s and most preferred between 500 and 8,000 Pa·s at 20° C. Furthermore the substance 19 has to have a relatively high viscosity index, in that the damper 11 has to function under varying temperature. The temperature can vary both due to variations in the ambient temperature, and because the semi-liquid substance 19 is heated by the blade 5 oscillates. Furthermore the semi-liquid substance 19 has to have good adhesive and cohesive strengths.

When the first damper part 13 is stretched due to blade 5 oscillations the motion is attempted transferred through the semi-liquid to the second damper part 12. Since the first damper part 12 is substantially inflexible and therefore do not stretch or move, or only stretches or moves very little, compared to the blade 5 and the first damper part 13, the shear forces and the shear deformation will be "absorbed" by the semi-liquid substance 19 and converted to heat, as long at there is a relative motion between the parts 12, 13.

Because the semi-liquid substance 19 behaves plastic, the energy of the motion is transformed to heat due to inner friction in the semi-liquid substance 19. If the semi-liquid substance 19 had elastic qualities, the energy would only be stored as potential energy and the damper 11 would in practice function as a spring, which is most disadvantageous, in that instead of damping the oscillations, it could possibly increase them.

In this embodiment of the invention the bars 15, 16 on the second damper part 12 and the first damper part 13 are formed as fins extending from a common base 20, 21, but in another embodiment of the invention the bars 16 of the second damper part 12 could be formed as a number of individual bars 16 placed in one or more slits or cavities 22 in the first damper part 13.

Figure 4:
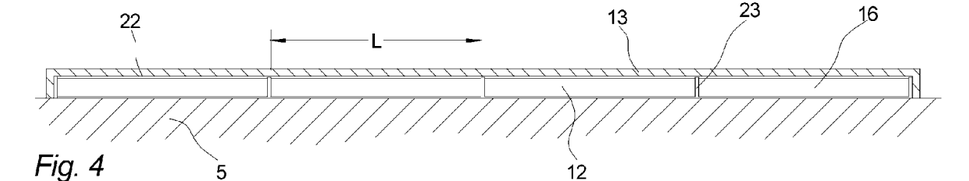
FIG. 4 illustrates a cross-section of an embodiment of an oscillation damper mounted on a wind turbine blade as seen in from the side.

FIG. 4 illustrates a cross-section of an embodiment of an oscillation damper 11 mounted on a wind turbine blade as seen in from the side.

In this embodiment of the invention the second damper part 12 comprise a number of rows of bars 16. Each of these rows comprises four bars 16 positioned substantially end to end as illustrated. The first damper part 13 is closed in the ends and to prevent the bars 16 from gathering in one end of the cavity, the bars 16 are separated by separating means 23 in form of cubes of gas-bubble filled elastomer. Elastomer is a material which can be stretched or compressed markedly and repeatedly and, immediately upon release of the stress, will return to its original length. By providing the elastomer with embedded gas bubbles, the separating means 23 is able to change volume when exposed to e.g. pressure, and because of the qualities of the elatomer, the separating means 23 will attempt to return to its original size, when the pressure is removed or reduced. Hereby it is possible to compensate for any change in the volume of the cavities 22, which may occur when the first damper part 13 is stretched or compressed due to blade 5 oscillations.

The length L of bars 16 of the second damper part 12 is in this embodiment of the invention approximately 1,000 mm, but could in another embodiment of the invention be both shorter or longer depending on the coupling, between the second damper part 12 and the first damper parts 13, ability to transfer the shear force and the rigidity or inflexibility of the second damper part 12.

Figure 5:
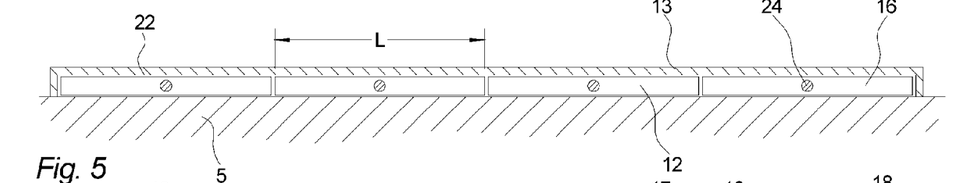
FIG. 5 illustrates a cross-section of another embodiment of an oscillation damper mounted on a wind turbine blade as seen in from the side.

FIG. 5 illustrates another cross-section of an embodiment of an oscillation damper 11 mounted on a wind turbine blade as seen in from the side.

In this embodiment of the invention the bars 16 of the second damper part 12 are prevented from gathering in one end of the cavity by fixating means 24. The fixating means 24 could be a pin, a rivet, a screw, adhesive means or the like fixating a bar 16 through the middle, whereby the bar is prevented from moving but the ends are free to move slightly, if the bar is extended due to shear of the first damper parts 13.

In another embodiment of the invention the fixating means 24 fixating the bars 16 could be a bulge in the cavity or something similar substantially keeping the entire bars from moving but allowing the ends of the bars to move slightly.

Figure 6:
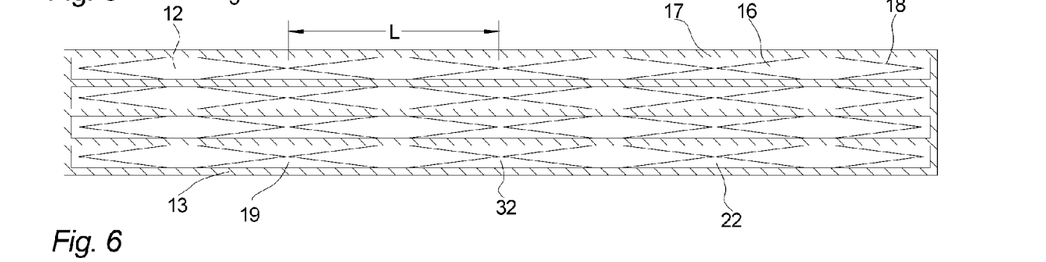
FIG. 6 illustrates a cross-section of an embodiment of an oscillation damper comprising tapered second damper parts as seen in from the top.

FIG. 6 illustrates a cross-section of an embodiment of an oscillation damper 11 comprising tapered second damper parts 12 as seen in from the top. The shear rate between the parts 12, 13 is increased towards the ends of the second damper parts 12 because of the increase of relative motion between the parts 12, 13. The risk of tearing the semi-liquid substance 19 therefore increases towards the ends of the second damper parts 12. In this embodiment of the invention the second damper parts 12 are therefore tapering towards the ends, hereby also reducing the shear angle between the parts 12, 13 towards the ends, when the first damper parts 13 are stretched or compressed. The tapering shape will therefore to some degree compensate for the increase in shear rate and thereby to some degree equalize the stress in the semi-liquid substance 19 in the dampers 11 longitudinal direction.

In this embodiment of the invention the tapering second damper parts 12 are made so wide at the middle that they touch the insides of the cavities 22. The tapering second damper parts 12 could then be attached to the insides of the cavities 22 at the touching parts e.g. by use of adhesive.

In this embodiment of the invention the tapering second damper parts 12 taper more or less linearly but in another embodiment the tapering sides could describe a curve, or the width of the parts could be reduced in steps. In general it can be said, that an infinite number of different designs of the entire second damper parts 12 are feasible, all depending on what material they are made of, which qualities the semi-liquid substance 19 has, in which types of blades they are to be used and under what circumstances.

Figure 7:
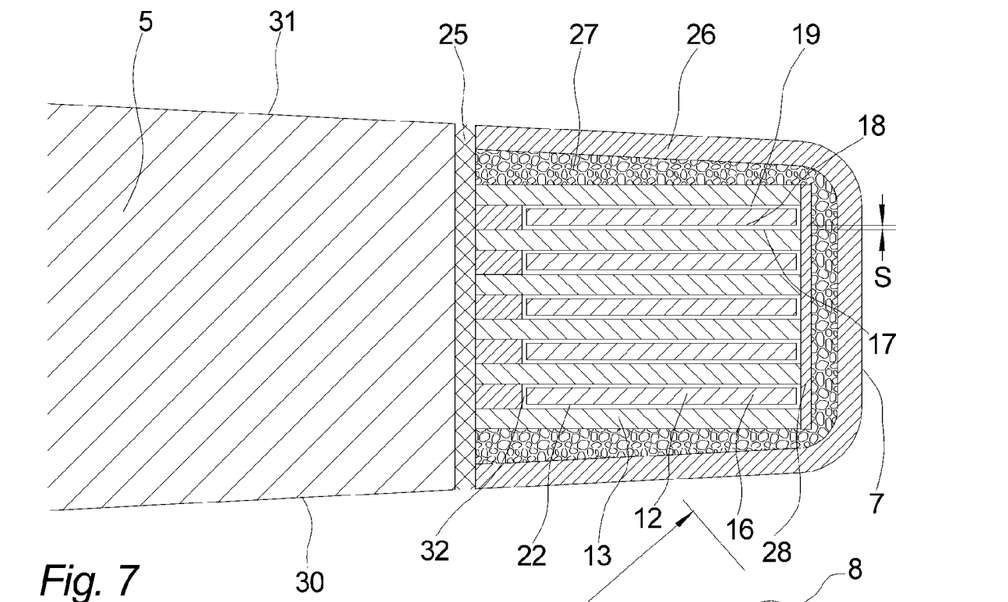
FIG. 7 illustrates a cross-section of an embodiment of a damper formed integrally in the blades load-transferring structure.

FIG. 7 illustrates a cross-section of an embodiment of a damper 11 formed integrally in the blades 5 load-transferring structure.

In this embodiment of the invention the base 20 and the bars 15 of the first damper part 13 are formed integrally in the blades 5 load-carrying structure. This means that for every kilogram the first damper part 13 adds to the blades 5 weight, the rigidity and initial stability of the blade 5 is increased substantially just as much as if the area was made of the usual blade material.

The first damper part 13 comprises five cavities 22 which are completely surrounded by the bars 15, the base 20 and a top cover 28. In each of these cavities 22 a number of individual bars 16 are placed substantially end to end, constituting the second damper part 12. The damper 11 is substantially surrounded by a capping profile 26, which is made of the same material as what constitutes the surface of the rest of the blade 5. The irregular space between the capping profile 26 and the damper 11 is filled with a blade filler 27 of the same material used to fill spaces in the rest of the blade 5. The damper 11, capping profile 26 and blade filler 27 are attached to the rest of the blade 5 by means of an adhesive 25, integrating the damper 5 in the blades 5 load-carrying structure.

In another embodiment of the invention the damper could be integrated in the blades 5 load-carrying structure during the manufacturing of the blade 5 and/or the blade 5 could comprise a plurality of dampers 11 integrated in the blades 5 load-carrying structure or added as extra weight to the blade 5 or both.

The distance S between a second damper part surface 18 on the second damper parts 12 and the closest first damper part surface 17 on the first damper parts 13 has to be relatively little, to improve the relative shear angle difference, hereby increasing the efficiency of the damper 11.

Figure 8:
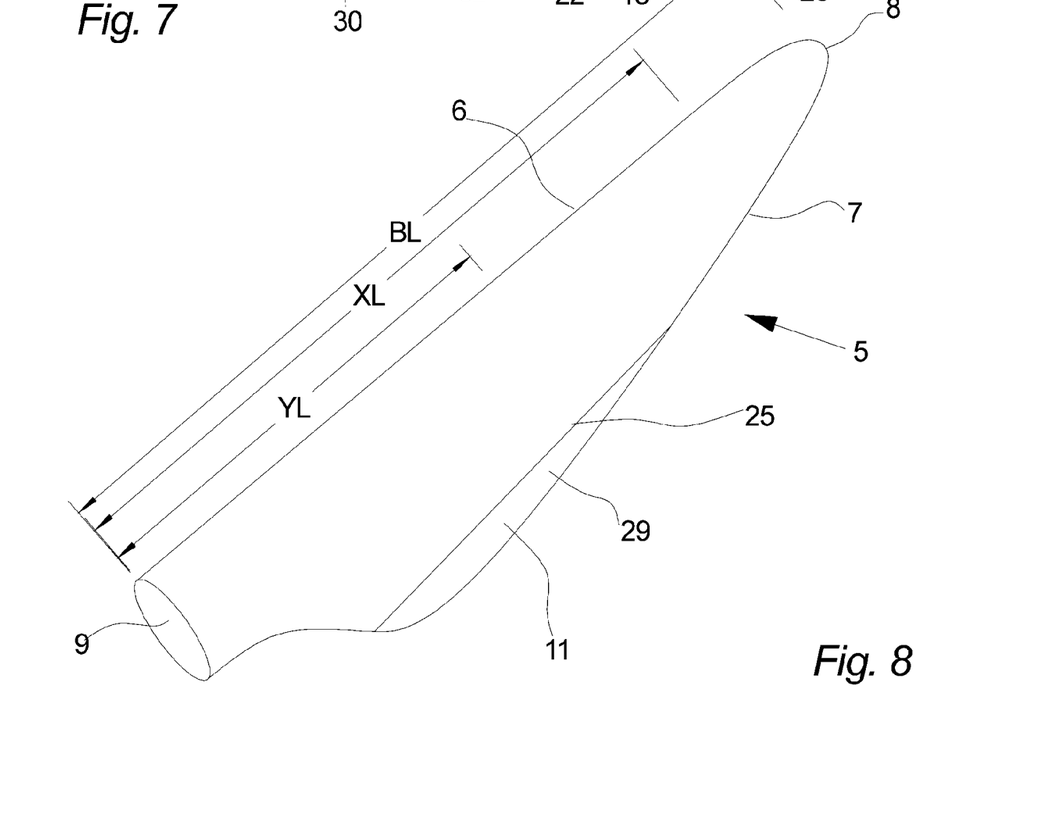
FIG. 8 illustrates wind turbine blade comprising a damper as seen in perspective.

FIG. 8 illustrates wind turbine blade 5 comprising a damper 11 as seen in perspective.

When a wind turbine blade 5 oscillates edgewise, alternately the trailing edge 7 and the leading edge 6 of the blade 5 are stretched and compressed. When the edges 6, 7 are stretched, it can in some cases lead to a more than 1 mm prolongation per meter of the edges 6, 7. Since the trailing edge 7 is furthest away from the blades elastic centre, this prolongation is more profound and therefore more critical along the trailing edge 7.

Because of the weight of the blade 5, the strain on the blade 5 is biggest closest to the root 9, and since the trailing edge 7 is rounded at the root 9 and thereby becomes substantially symmetrical around the blades elastic centre, the strain in the blade 5 is biggest at the inner part 29 of the trailing edge 7 just before the edge 7 becomes rounded.

In this embodiment of the invention a damper 11, such as the one illustrated in FIG. 7, is integrated in the inner part 29 of the trailing edge 7 by attaching a part of the trailing edge 7 to the rest of the blade 5 by adhesive means 25, making the damper 5 or at least the first damper part 13 an integrated part of the blades load-carrying structure.

In this embodiment of the invention the damper 11 is placed on the part of the blade 5 which are constituted by the inner 50% YL of the blades 5 total length BL, but in another embodiment of the invention the damper 11 could be placed on the inner 80% XL of the blade 5.

Figure 9:
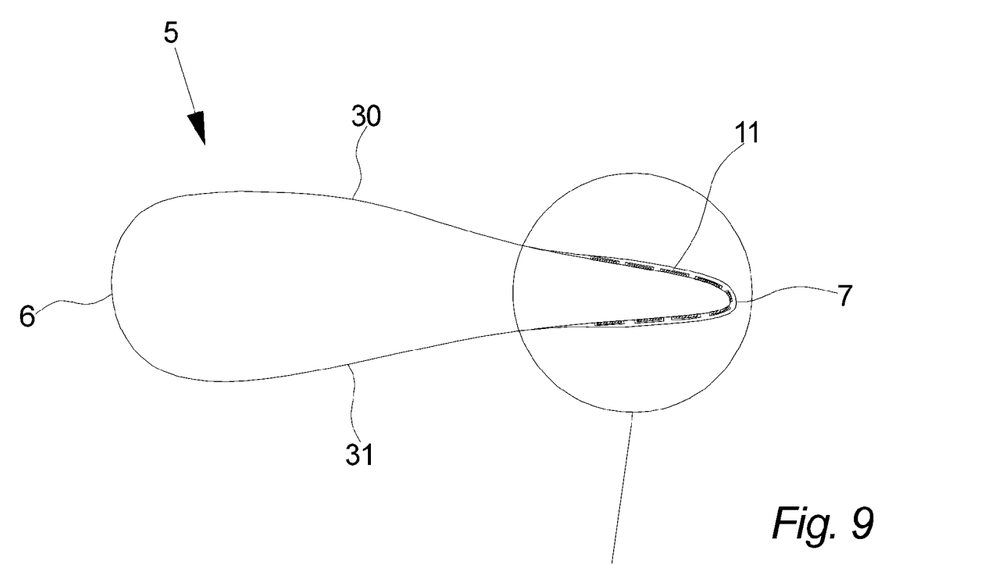
FIG. 9 illustrates a cross-section of a wind turbine blade comprising an embodiment of an oscillation damper.

FIG. 9 illustrates a cross-section of a wind turbine blade 5 comprising an embodiment of an oscillation damper 11.

In this embodiment of the invention the damper 11 is placed on the outside of the blade, directly on the blades 5 surface, both on the pressure-and leeward side 30, 31 along the trailing edge 7. This embodiment of a damper 11 could e.g. be retrofitted on an existing blade 5.

Figure 10:
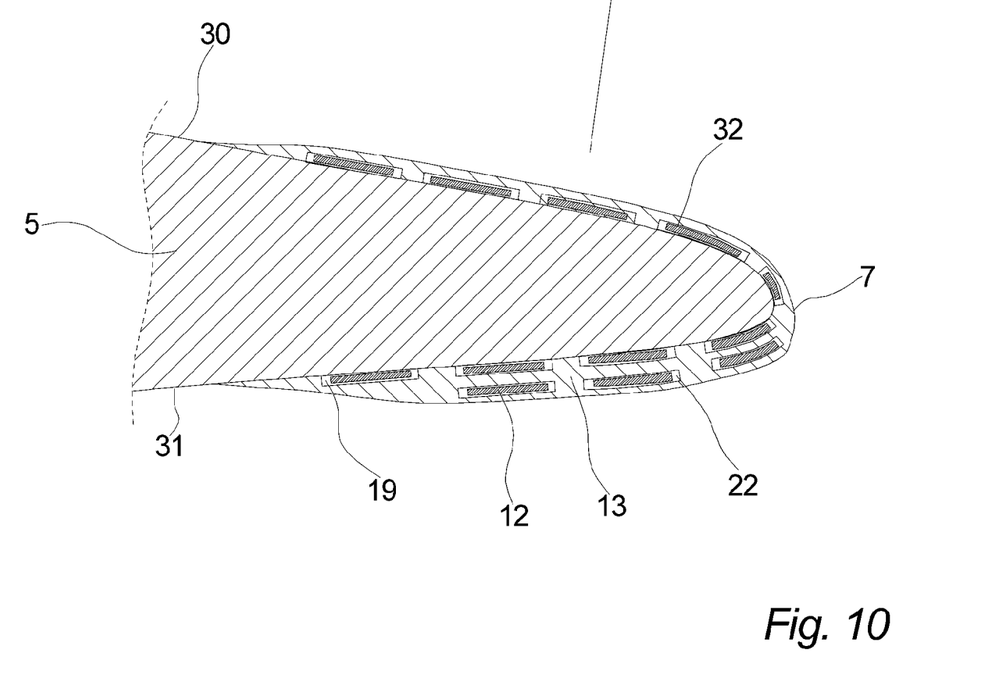
FIG. 10 illustrates a part of the cross-section of the wind turbine blade illustrated in FIG. 9.

FIG. 10 illustrates a part of the cross-section of a wind turbine blade 5 illustrated in FIG. 9. The oscillation damper 11 does in this embodiment of the invention comprise a first damper part 13 formed to fit exactly on the surface of the blade 5 around to trailing edge 7. The first damper part 13 comprise a number of rectangular or substantially rectangular cavities 22 wherein a number of rectangular shaped second damper parts 12 are placed surrounded or substantially surrounded by a semi-liquid substance 19.

By making the cavities 22 and the second damper parts 12 rectangular, it is possible to make a large shear area, and at the same time minimize the dampers extend perpendicularly to the blade surface, but in another embodiment of the invention, the cavities 22 and second damper parts 12 could be circular, ellipse or polygonal shaped or one or both could have an irregular shape.

Figure 11:
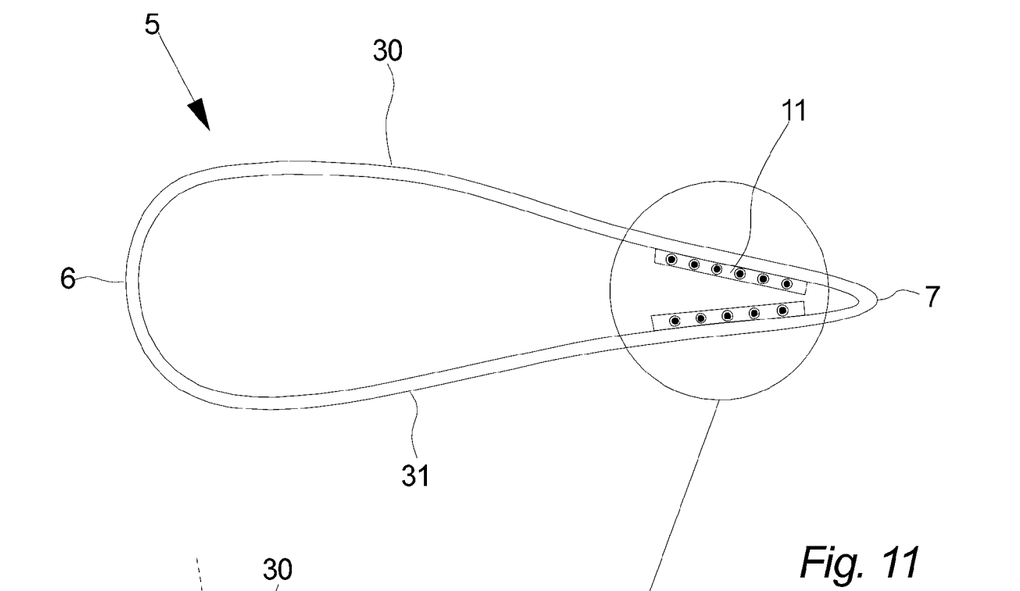
FIG. 11 illustrates a cross-section of a wind turbine blade comprising another embodiment of an oscillation damper.

FIG. 11 illustrates a cross-section of a wind turbine blade 5 comprising another embodiment of an oscillation damper 11.

In this embodiment of the invention the dampers 11 are placed on the inside of the blade, both on the pressure-and leeward side 30, 31 along the trailing edge 7. This embodiment of a damper 11 could e.g. be retrofitted on an existing blade 5.

Figure 12:
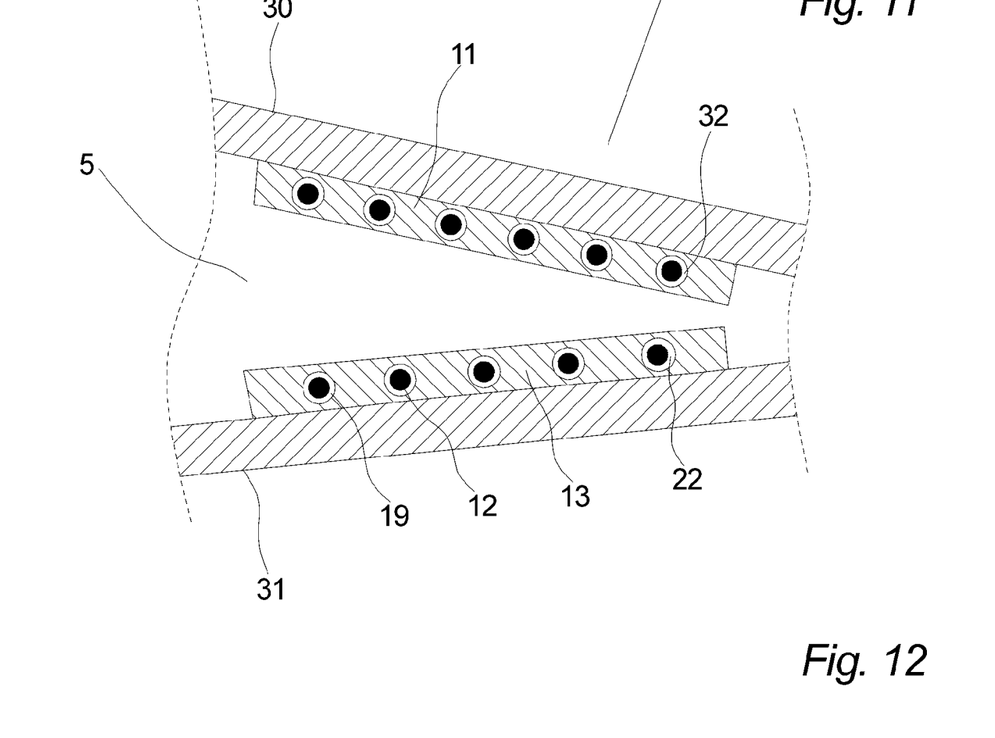
FIG. 12 illustrates a part of the cross-section of the wind turbine blade illustrated in FIG. 11.

FIG. 12 illustrates a part of the cross-section of a wind turbine blade 5 illustrated in FIG. 11. In this embodiment of the invention the first damper part 13 could be made of a relatively flexible material. Hereby it is possible to adapt the damper 11 to an irregular surface on the inside or the outside surface of the blade 5. By making the cavities 22 and the second damper parts 12 circular, they are less sensitive to transverse bends in the first damper part 12. Hereby it is possible to retrofit the damper 11 on an existing blade 5. In another embodiment of the invention, the second damper parts 12 could have another cross-sectional shape, such as elliptic, square, rectangular or polygonal.

In another embodiment of the invention the second damper parts 12 could also be hollow e.g. as tubes, to reduce their weight and at the same time ensure that they have a large shear area.

Figure 13:
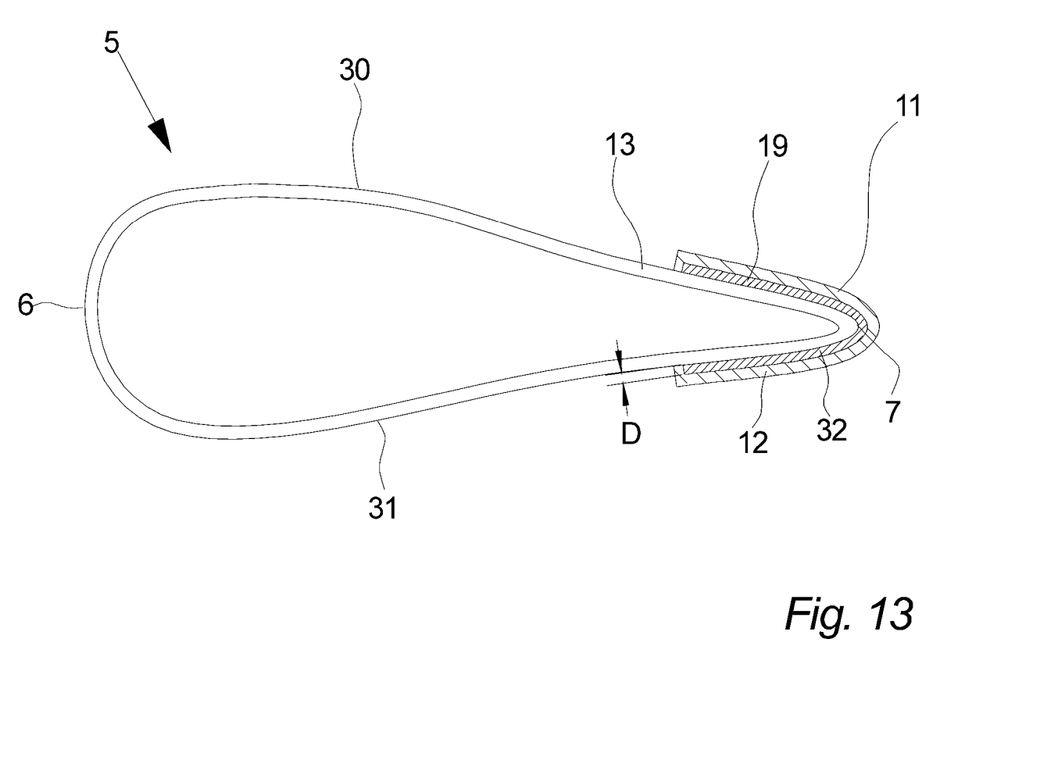
FIG. 13 illustrates a cross-section of a wind turbine blade comprising another embodiment of an oscillation damper.

FIG. 13 illustrates a cross-section of a wind turbine blade comprising another embodiment of an oscillation damper. In this embodiment of the invention the second damper part 12 are formed as one big plate attached the outside surface of the blade 5 along the trailing edge 7. Between the second damper part 12 and the blade 5, which in this case functions as the first damper part 13, is placed a semi-liquid substance 19, which is completely surrounded by the blade 5 and the second damper part 12 to prevent it from being displaced.

When the blade 5 oscillates edge-wise the semi-liquid substance 19 will function as a load-transferring coupling and attempt to transfer the motion to the second damper part 12. If the second damper part is substantially inflexible the kinetic energy of the motion will more or less dissipate hereby providing the damper 11 with its desired damping effect.

The invention has been exemplified above with reference to specific examples of oscillation dampers 11 for wind turbine blades 5. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Leading edge
7. Trailing edge
8. Tip
9. Root
10. Crack
11. Oscillation damper
12. Second damper part
13. First damper part
14. Side part
15. Bar of first damper part
16. Bar of second damper part
17. First damper part surface
18. Second damper part surface
19. Semi-liquid substance
20. Base of first damper part
21. Base of second damper part
22. Cavity
23. Separating means
24. Fixating means
25. Adhesive
26. Capping profile
27. Blade filler
28. Top cover
29. Inner part of trailing edge
30. Leeward side
31. Pressure side
32. Load transferring coupling
S. Distance between first and second damper parts surfaces
BL. Blade length
XL. Inner 80% of blade
YL. Inner 50% of blade
L. Length of second damper part

What is claimed is:

1. A wind turbine blade comprising one or more oscillation dampers for damping oscillations or vibrations of the wind turbine blade, said dampers comprising
    one or more first damper parts having one or more first damper part surfaces, said first damper parts being rigidly connected to said blade or being a part of said blade,
    one or more second damper parts having one or more second damper part surfaces,
    wherein said first damper part surfaces and said second damper part surfaces are arranged to move relatively to each other during said oscillations, said dampers further comprising a load transferring coupling directly or indirectly coupling said first damper part surfaces and said second damper part surfaces, so that said relative movement result in a oscillation-damping dissipation of kinetic energy, and
    wherein said load transferring coupling comprises a semi-liquid substance.

2. The wind turbine blade according to claim 1, wherein said one or more oscillation dampers are positioned on or in the part of said wind turbine blade which are constituted by the inner 80% of said blades total length, as measured from the root of said blade.

3. The wind turbine blade according to claim 1, wherein said one or more oscillation dampers are positioned in, on or in proximity of said wind turbine blades trailing edge.

4. The wind turbine blade according to claim 1, wherein said second damper parts are substantially inflexible.

5. The wind turbine blade according to claim 1, wherein said one or more second damper parts has a relationship between modulus of elasticity and density which is greater than 10 MPa·m$^3$/kg.

6. The wind turbine blade according to claim 1, wherein said one or more second damper parts are made of a fibre reinforced polymer-matrix composite.

7. The wind turbine blade according to claim 1, wherein said load transferring coupling has a high load transferring capacity, which at least is better than waters load transferring capacity.

8. The wind turbine blade according to claim 1, wherein at least one of said one or more second damper parts and said one or more first damper parts has an elongated shape.

9. The wind turbine blade according to claim 1, wherein said one or more first damper parts comprise one or more cavities, wherein said one or more second damper parts are substantially located.

10. The wind turbine blade according to claim 9, wherein said one or more cavities comprise more than one of said second damper parts.

11. The wind turbine blade according to claim 9, wherein said one or more cavities are formed as orifices, slits, gaps, or holes.

12. The wind turbine blade according to claim 9, wherein said more than one second damper parts are placed substantially end to end in said one or more cavities.

13. The wind turbine blade according to claim 1, wherein at least one of said one or more second damper parts and said one or more first damper parts comprise separating or fixating means for substantially preventing said one or more second damper parts from moving freely at least in their longitudinal direction.

14. The wind turbine blade according to claim 13, wherein said separating means are volume compensating material positioned between or at the ends of said one or more second damper parts.

15. The wind turbine blade according to claim 13, wherein said fixating means comprise means for fixating said one or more second damper parts at the middle or in close proximity of the middle of said one or more second damper parts longitudinal extent.

16. The wind turbine blade according to claim 1, wherein said semi-liquid substance surrounds or substantially surrounds said one or more second damper parts.

17. The wind turbine blade according to claim 16, wherein said semi-liquid substance has a viscosity of between 50 and 200,000 Pa·s.

18. The wind turbine blade according to claim 1, wherein said semi-liquid substance has a viscosity index which is greater than 80.

19. The wind turbine blade according to claim 1, wherein said semi-liquid substance are completely surrounded by at least one of said one or more first damper parts and said blade.

20. The wind turbine blade according to claim 1, wherein said one or more first damper parts are formed integrally in said blades load-carrying structure.

21. The wind turbine blade according to claim 1, wherein said one or more oscillation dampers are positioned in, on or in proximity of the position on or in said wind turbine blade where the strain originating from edgewise blade oscillations is the biggest.

22. The wind turbine blade according to claim 1, wherein said one or more second damper parts has a longitudinal extent of between 10 and 10,000 mm.

23. The wind turbine blade according to claim 1, wherein the distance between a first damper part surface and a second damper part surface is between 0.001 and 2 mm.

24. The wind turbine blade according to claim 1, wherein said one or more oscillation dampers are provided primarily for damping edgewise oscillations or vibrations of said wind turbine blade.

25. The wind turbine comprising at least one wind turbine blade according to claim 1.

26. An oscillation damper for damping edgewise oscillations or vibrations of a wind turbine blade, said damper comprising one or more first damper parts having one or more first damper part surfaces, one or more second damper parts having one or more second damper part surfaces, wherein said first damper part surfaces and said second damper part surfaces are arranged to move relatively to each other during said oscillations, said dampers further comprising a load transferring coupling directly or indirectly coupling said first damper part surfaces and said second damper part surfaces, so that said relative movement result in a oscillation-damping dissipation of kinetic energy,
wherein said load transferring coupling comprises a semi-liquid substance.

27. The oscillation damper according to claim 26, wherein said one or more first damper parts comprise one or more cavities, wherein said one or more second damper parts are substantially located.

28. The oscillation damper according to claim 26, wherein at least one of said one or more second damper parts and said one or more first damper parts has an elongated shape.

29. The oscillation damper according to claim 26, wherein said damper comprise means for substantially preventing said one or more second damper parts from moving freely at least in their longitudinal direction.

30. The oscillation damper according to claim 26, wherein said second damper parts are substantially inflexible, having a relationship between modulus of elasticity and density which is greater than 10 MPa·m³/kg.

31. A method for damping oscillations of a wind turbine blade, said method comprising the steps of
integrating or joining one or more first damper parts having one or more first damper part surfaces in or to said wind turbine blade,
arranging one or more second damper part surfaces of one or more second damper parts to move relatively to said one or more first damper part surfaces during said oscillations, and
directly or indirectly coupling said first damper part surfaces to said second damper part surfaces by means of a load transferring coupling, so that said relative movement result in a oscillation-damping dissipation of kinetic energy,
wherein said load transferring coupling comprises a semi-liquid substance.

32. The method according to claim 31, wherein said semi-liquid substance has a viscosity of between 50 and 200,000 Pa·s.

33. The method according to claim 31, wherein said method further involves preventing said one or more second damper parts from moving freely at least in a longitudinal direction.

34. The method according to claim 31 wherein said oscillation damper is supplementary mounted as a unit to a wind turbine blade.

* * * * *